Figure 1:
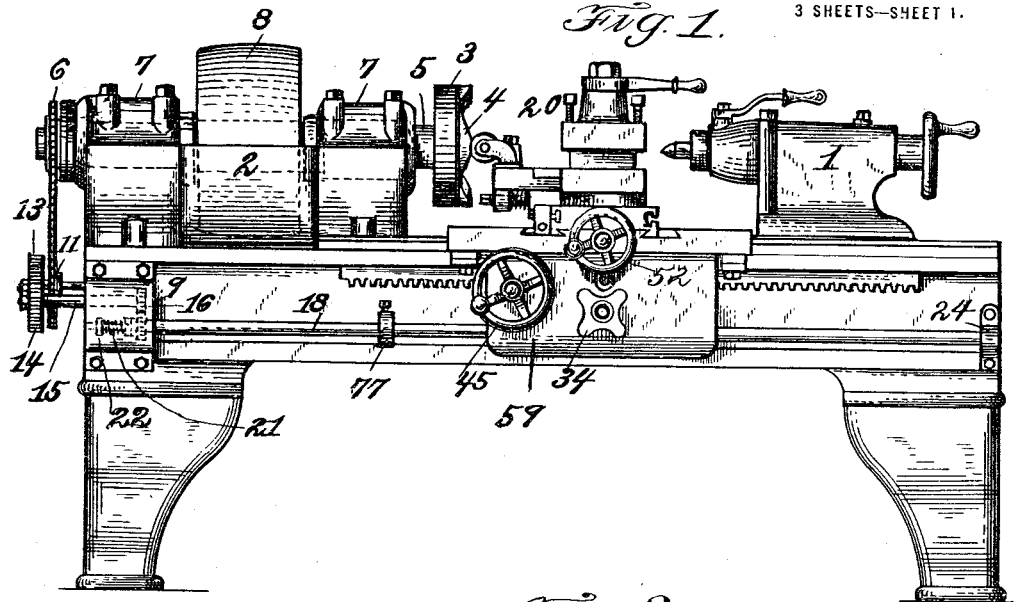

S. W. SPARKS.
LATHE.
APPLICATION FILED NOV. 22, 1915.

1,179,361.

Patented Apr. 11, 1916.
3 SHEETS—SHEET 1.

Witness
J. C. Turner

Inventor.
S. W. Sparks
By Karl Funning
his Attorney.

S. W. SPARKS.
LATHE.
APPLICATION FILED NOV. 22, 1915.
1,179,361.
Patented Apr. 11, 1916.
3 SHEETS—SHEET 2.
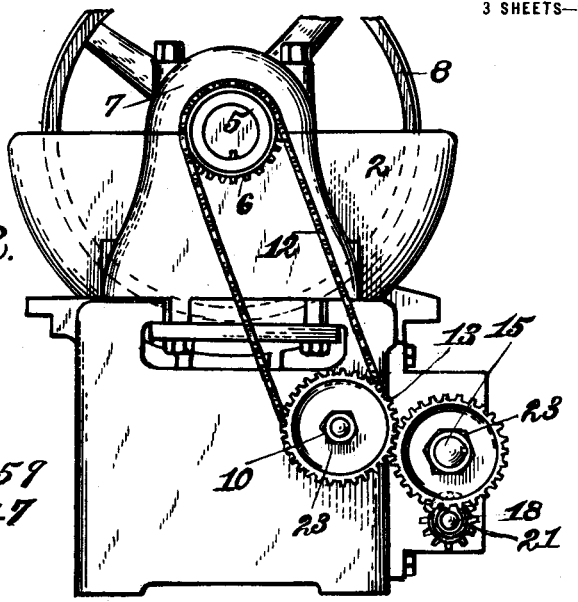
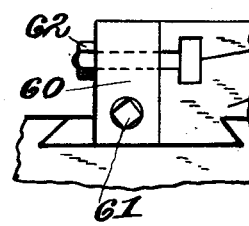
Witness
J. C. Turner
Inventor:
S. W. Sparks
By Karl Fenning
his Attorney.

S. W. SPARKS.
LATHE.
APPLICATION FILED NOV. 22, 1915.

1,179,361.

Patented Apr. 11, 1916.
3 SHEETS—SHEET 3.

Witness
J. C. Turner

Inventor
S. W. Sparks
By Karl Fenwig
his Attorney.

UNITED STATES PATENT OFFICE.

STANLEY W. SPARKS, OF CLEVELAND, OHIO, ASSIGNOR TO THE CLEVELAND MACHINERY & SUPPLY COMPANY, A CORPORATION OF OHIO.

LATHE.

1,179,361. Specification of Letters Patent. Patented Apr. 11, 1916.

Application filed November 22, 1915. Serial No. 62,778.

*To all whom it may concern:*

Be it known that I. STANLEY W. SPARKS, a citizen of the United States, residing at Cleveland, county of Cuyahoga, and State of Ohio, have invented certain new and useful Improvements in Lathes, of which the following is a specification.

My invention relates particularly to lathes which are intended for a single purpose. Such lathes work upon the same sort of material and form it in the same way repeatedly. There is in such lathes no necessity for much of the adjustability or changeability generally provided in order to adapt lathes to various sizes, types and characters of material to be worked upon and devices to be produced.

It is one object of my invention to take advantage of this condition because of the lack of necessity for complication involved in providing for adjustments, etc., to produce a lathe which is simple, sturdy and efficient for the single purpose to which it is devoted.

The tail stock is greatly simplified and its frame may be made of a single casting rather than being made in the several pieces necessitated by the demand for adjustability. The head stock likewise may be greatly simplified and the usual gearing and speed changing mechanism partially or wholly omitted, the device being built and arranged initially to operate at the desired proper speed from the selected source of power.

As a more or less integral part of the machine I may provide a forming mechanism which will autmatically move the cutting tool in relation to the material to be worked so as to produce the desired form in the completed article. Likewise when there is to be produced a peculiar or characteristic marking at some part of the work a more or less integral device is provided for making such marking automatically on each piece of work.

The apron which carries the tool carriage I prefer to arrange, and it is so shown in the specific device illustrated, to be caused to travel through a pinion permanently mounted in it and provided with a feather engaging a keyway in a lead shaft. The ordinary worm lead shaft is thus avoided. On the lead shaft I prefer to provide an adjustable block or collar which may be engaged by the apron at the end of its travel so as to cause the mechanism for operating the lead shaft to be thrown out of engagement and so avoid an over-travel of the apron and the tool carriage. Adjacent one end of the lead shaft I prefer to arrange a gear box acting as a driving mechanism for the lead shaft and being in turn driven preferably by a chain from the spindle of the head stock rather than by gears. In connection with this gear box mechanism is provided for varying the speed of rotation of the lead shaft when needed.

All of the details indicated are not essential to all phases of my invention nor are the specific details hereinafter described and illustrated in the accompanying drawings in which—

Figure 3:
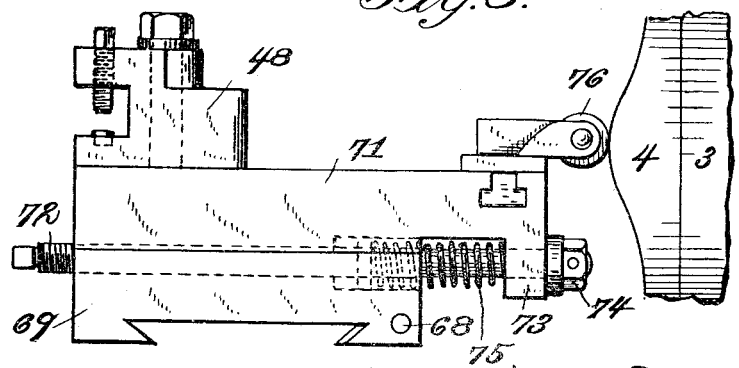
Figure 5:
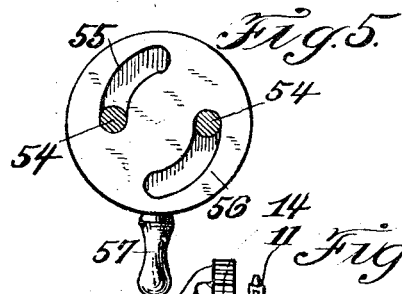
Figure 6:
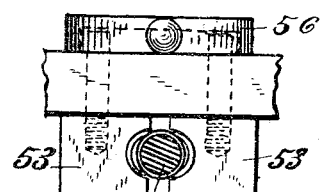
Figure 11:
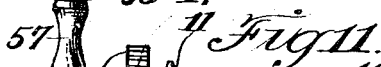
Figure 7:
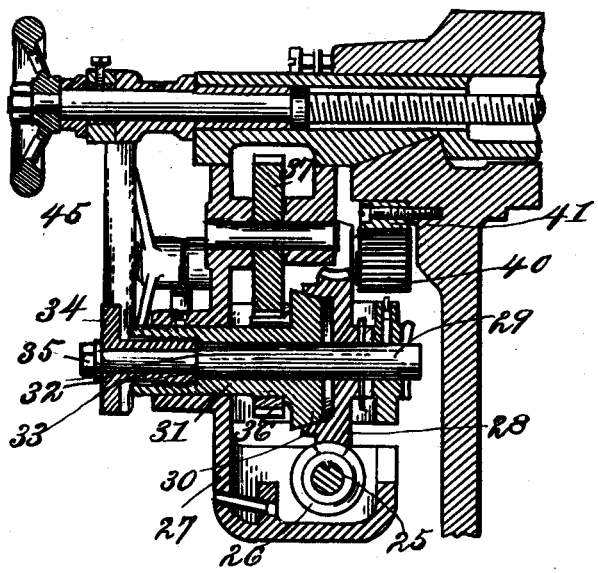
Figure 8:
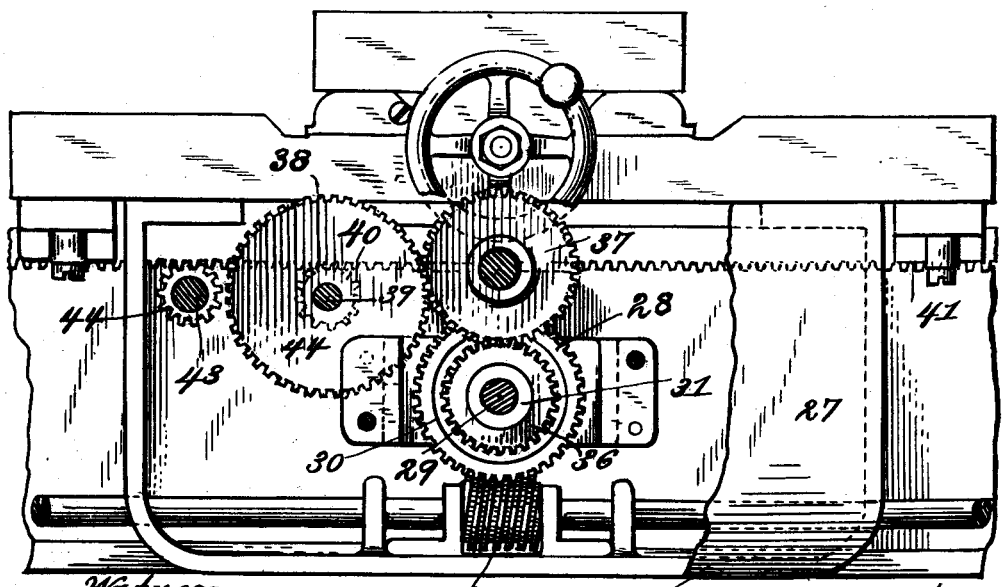

Figure 1 is a side elevation of one form of lathe containing my invention. Fig. 2 is an end view of the same, broken away in part. Fig. 3 is an enlarged elevation of the marking device and a part of its operating cam on the face plate. Fig. 4 is an elevation of the tool carriage and attachments showing the lathe bed in section. Fig. 5 is a bottom plan of a cam, and Fig. 6 is an elevation of cam and a split nut carried by the carriage. Fig. 7 is a transverse section through the apron and part of the tool carriage and lathe bed. Fig. 8 is an elevation of the apron with cover broken away. Fig. 9 is a plan of an optional form of head stock, and Figs. 10 and 11 are enlarged views of details of construction.

The lathe includes a tail stock 1 which as shown has a frame comprising a single casting. The tail stock as a whole is made to move to the right or the left of Fig. 1 but because of its frame being a single casting it has no other adjustment either upward or to rotate on a vertical axis. At the other end of the lathe is a head stock 2 which is provided with a face plate 3 which may clamp the material to be worked upon between itself and the tail stock so that when the face plate is rotated the work will rotate. On the face plate 3 is provided a cam 4 for a purpose hereinafter to be described. The face plate 3 is carried by a shaft or spindle 5 which extends through the head stock and carries at its opposite end a sprocket 6. Between the face plate and the sprocket the spindle 5 is mounted in bearings 7 and between these bearings on the spindle is mounted a pulley 8 over which a belt may run to drive the shaft or spindle 5. A gear box 9 is mounted on the lathe frame below the head stock and from it projects a shaft 10 which carries a sprocket 11 in line with the sprocket 6. A chain 12 passes over the sprockets 6 and 11 so that when the spindle 5 is rotated the shaft 10 also rotates. Carried on shaft 10 and beyond the sprocket 11 is a gear 13 which engages a gear 14 which in turn is carried by a second shaft 15 extending within the gear box 9. At the other end of the shaft 15 is a gear 16 within the gear box which engages a gear 17 which is loosely mounted on a lead shaft 18. Integral with the gear 17 is a clutch member 19 and a corresponding clutch member 20, mounted on the lead shaft 18, is normally held in engagement with the clutch member 19 by a spring 21 mounted on the lead shaft between the clutch member 20 and the bearing 22 in which the lead shaft rotates and through which it has a longitudinal movement. The gears 13 and 14 are held on their shafts by nuts 23 so that by the removal of these nuts the gears 13 and 14 may be removed and interchanged or replaced by gears of other relative sizes so as to provide for a variation in speed of rotation of the lead shaft and so provide for variations in speed of travel of the tool carriage.

The lead shaft 18 extends across the whole length of the lathe having one bearing 22 in the gear box 9 and another bearing 24 at the opposite end of the lathe. The lead shaft is provided with a key-way 25 which engages a key in a worm pinion 26 through which it extends. The pinion 26 is mounted in bearings in the apron 27 and engages a gear 28 which is mounted on a shaft 29 carried by the apron. The front side of the gear 28 is formed to be one member of a clutch 30. The other member of the clutch 30 is extended into a sleeve 31 surrounding the shaft 29. At its outer end the shaft 29 is reduced in section so as to provide a shoulder 32 and surrounding this outer end of the shaft 29 is a tubular nut 33 provided with a hand wheel 34. The inner end of the tubular nut 33 abuts against the shoulder 32 on the shaft 29 and also projects into the outer end of the sleeve 31. The outer end of the sleeve 31 is provided with interior screw threads which are engaged by similar threads on the outer surface of the tubular nut 33. The tubular nut 33 may rotate on the shaft 29 but it is prevented from having longitudinal movement thereon since it is held between the shoulder 32 and the nut 35 on the end of the shaft 29. It will be observed then that by turning the tubular nut 33 the two members of the clutch 30 may be caused to engage each other or to recede from each other. On the sleeve 31 is a gear 36 which engages a gear 37 mounted on a stud shaft in the apron. The gear 37 in turn engages a gear 38 mounted on a shaft 39 in the apron. The shaft 39 carries at its inner end a pinion 40 which engages a rack 41 on the underside of the bed of the lathe so that when the pinion 40 is rotated through the mechanism just described it will cause the apron and the tool carriage carried thereby to travel along the bed of the lathe. On a shaft 43 in the apron is mounted a similar pinion 44 engaging the rack 41 and at the outer end of the shaft 43 is a hand wheel 45 to turn the pinion 44. When the clutch 30 has been released by operating the hand wheel 34 the carriage can then be caused to traverse the lathe bed by turning the hand wheel 45. Carried by the apron is a tool carriage 46 on which is mounted a tool turret 47 so as to attack the work from the front and also a tool post 48 to attack the work from the rear. While not essential to my invention I prefer to provide the bed of the lathe with an ordinary V 49 at its rear and a compensating V 50 at its front edge, acting as guides for the tool carriage. Through the tool carriage 46 passes a worm shaft 51 provided with a hand wheel 52 and in the turret 47 is provided a split nut 53 having projecting from each half thereof a pin 54 each of which rides in a cam slot 55 in the lower face of a disk 56. The disk 56 is provided with a handle 57 by which it may be turned and in so doing it causes the split nut 52 to engage or disengage the worm shaft 51. When the cam disk has been so turned as to cause the split nut to engage the worm shaft the tool turret may be moved toward or from the work by turning the hand wheel 52. When the disk 56, however, has been turned so as to disengage the split nut from the worm shaft the tool turret is free to be moved toward or from the work independently of the worm shaft 51. A similar split nut and cam mechanism 58 is provided on the tool post 48 permitting it to be engaged by or released from the worm shaft 51. The base of the tool turret 47 is provided with a T-shaped slot 59. At one side and against this rests a block 60 in which is mounted one end of a shaft 61 which passes across the lathe and extends beyond the rear thereof. Bolts whose heads rest in the T-shaped slot 59 pass through the block 60 and are provided with nuts 62 on their ends so that when the nuts are loosened the block 60 and the turret may have an independent motion, but when the nuts are tightened and the heads of the bolts drawn outward against the face of the T-shaped slot 59 the block is held rigidly against the turret 47 so that independent movement on the bed is impossible. A bracket 63 is provided at the rear of the lathe frame and bolts 64 hold in place on the bracket 63 a casting 65 in which is a cam slot 66. The contour of the cam slot 66 is made to correspond with the contour of the surface desired on the finished work. Depending from the rear end of the rod 61 is a roller 67 riding in the cam slot 66 and causing the block 60 and the tool turret (when the nuts 62 are tightened) to move toward or from the work so as to produce the desired contour thereon as the carriage is moved along the bed of the lathe.

The tool post 48 is provided with means for giving the tool a reciprocating longitudinal movement during a rotation of the work. The rod 61 passes through a bearing 68 in the base 69 of the tool post 48 and the top of this base is dove-tailed at 70 to provide a sliding bearing for the upper part 71 of the tool post 48. A rod 72 adjustable in the base 69 extends through a lug 73 depending from the movable portion 71 and is held therein by a nut 74. Between the lug 73 and the base 69 is a spring 75 which tends to hold the lug 73 snugly against the nut 74. Mounted on the movable part 71 is an overhanging roller 76 which engages the cam 4 carried by the face plate 3 on the spindle 5 so that as the spindle rotates it causes the cam to engage the roller 76 and so in coöperation with the opposing spring 75 reciprocates the tool post 48.

It will be seen then that the spindle 5 may be rotated through the pulley 8 and so the face plate and work rotate. At the same time movement is transmitted through the chain 12 engaging the sprockets 6 and 11 to the shaft 10 which causes the gear 13 to engage the gear 14 and turn the gear 16 which turns the gear 17 and through the clutch 19 and 20 rotates the lead shaft 18 which in turn rotates the pinion 26 and through it the gear 28 which through the clutch 30 causes the gear 36 to rotate the gear 37 which turns the gear 38 and so the pinion 40 engages the rack 41 and causes the carriage and the tool to be traversed along the bed of the lathe. During this travel the tool turret 47 may be caused to approach or recede from the work through the roller 67 on the shaft 61 traveling in the longitudinal cam slot 66. When the apron has reached the end of its travel it will engage the adjustable stop 77 on the lead shaft 18 and cause the lead shaft 18 to be given a slight longitudinal movement so as to disengage the clutch members 19 and 20. This will cause the lead shaft to cease its rotation and consequently terminate the travel of the tool carriage. The roller 76 may be brought into proper proximity with the cam 4 on the face plate 3 and so the tool post 48 be given the proper reciprocating motion during each rotation of the face plate 3.

In Fig. 9 I have shown an optional construction in which the pulley 8 is mounted on a jack shaft 78 carrying a gear 79 which engages a gear 80 mounted on the spindle 5 so as to cause it to rotate. This arrangement may be substituted for the arrangement above described in which the pulley 8 is mounted directly upon the spindle 5.

I claim as my invention:

1. In a lathe, a spindle, a face plate on the spindle, a tool carriage, a transversely movable portion of the tool carriage, a laterally movable portion of the tool carriage, a rod on the transversely movable portion of the tool carriage and extending into the laterally movable portion of the tool carriage, a spring on the rod between the two portions tending to hold them apart, an arm on the laterally movable portion, a roller on the arm, a cam surface on the face plate engaging the roller to move the laterally movable portion of the tool carriage against the spring, a portion of the tool carriage movable toward and from the work, a rod on said portion extending across the lathe bed, a roller depending from said rod, a cam slot supported on the lathe frame back of the bed in which the roller travels to move the last mentioned portion of the tool carriage, a block on the rod, a T-shaped slot in the said portion of the tool carriage, bolts having heads in said slot and passing through said block, nuts on said bolts which may cause the block and the said portion of the tool carriage to move together or to have independent movement, a cam revolubly mounted on the last mentioned movable portion of the tool carriage, a split nut carried by said movable portion, pins on the parts of the split nut and engaged by the cam, and a worm shaft caused to be engaged or released by the split nut as the cam is rotated.

2. In a lathe, a spindle, a face plate on the spindle, a tool carriage, a transversely movable portion of the tool carriage, a laterally movable portion of the tool carriage, a rod on the transversely movable portion of the tool carriage and extending into the laterally movable portion of the tool carriage, a spring on the rod between the two portions tending to hold them apart, an arm on the laterally movable portion, a roller on the arm, and a cam surface on the face plate engaging the roller to move the laterally movable portion of the tool carriage against the spring.

3. In a lathe, a tool carriage, a portion of the tool carriage movable toward and from the work, a rod on said portion extending across the lathe bed, a roller depending from said rod, a cam slot supported on the lathe frame back of the bed in which the roller travels to move the movable portion of the tool carriage, a block on the rod, a T-shaped slot in the said portion of the tool carriage, bolts having heads in said slot and passing through said block, nuts on said bolts which may cause the block and the said portion of the tool carriage to move together or to have independent movement, a cam revolubly mounted on the movable portion of the tool carriage, a split nut carried by said movable portion, pins on the parts of the split nut and engaged by the cam, and a worm shaft caused to be engaged or released by the split nut as the cam is rotated.

4. In a lathe, a spindle, a face plate on the spindle, a tool carriage, a transversely movable portion of the tool carriage, a laterally movable portion of the tool carriage, a rod on the transversely movable portion of the tool carriage and extending into the laterally movable portion of the tool carriage, a spring on the rod between the two portions tending to hold them apart, a roller on the laterally movable portion, a cam surface on the face plate engaging the roller to move the laterally movable portion of the tool carriage against the spring, a portion of the tool carriage movable toward and from the work, a rod on said portion, a roller on the rod, a cam slot in which the roller travels to move the last mentioned portion of the tool carriage, means to cause the rod and the said portion of the tool carriage to move together or to have independent movement, a worm shaft, and means to cause the worm shaft to engage or release the last mentioned movable portion of the tool carriage.

Signed at Cleveland this 19 day of November, 1915.

STANLEY W. SPARKS.